(12) United States Patent
Ishikawa et al.

(10) Patent No.: US 9,663,110 B2
(45) Date of Patent: May 30, 2017

(54) CONTROL APPARATUS FOR TRANSMISSION FOR VEHICLE

(71) Applicant: TOYOTA JIDOSHA KABUSHIKI KAISHA, Toyota-shi, Aichi-ken (JP)

(72) Inventors: Shuhei Ishikawa, Toyota (JP); Motonori Kimura, Toyota (JP); Atsushi Ayabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/032,536

(22) PCT Filed: Nov. 12, 2013

(86) PCT No.: PCT/JP2013/080540
§ 371 (c)(1),
(2) Date: Apr. 27, 2016

(87) PCT Pub. No.: WO2015/071954
PCT Pub. Date: May 21, 2015

(65) Prior Publication Data
US 2016/0272212 A1  Sep. 22, 2016

(51) Int. Cl.
*B60W 10/06* (2006.01)
*B60W 30/19* (2012.01)
(Continued)

(52) U.S. Cl.
CPC ............ *B60W 30/19* (2013.01); *B60W 10/06* (2013.01); *B60W 10/107* (2013.01); *F16H 61/04* (2013.01);
(Continued)

(58) Field of Classification Search
None
See application file for complete search history.

(56) References Cited

U.S. PATENT DOCUMENTS

| | | | | | |
|---|---|---|---|---|---|
| 4,831,898 | A | * | 5/1989 | Miyawaki | B60W 30/18 477/43 |
| 4,833,944 | A | * | 5/1989 | Tanaka | B60W 30/18 477/139 |

(Continued)

FOREIGN PATENT DOCUMENTS

JP        S62-45455 U      3/1987

*Primary Examiner* — Dirk Wright
(74) *Attorney, Agent, or Firm* — Oliff PLC (57) ABSTRACT

A vehicle transmission has a continuously variable speed change mechanism provided between an input shaft to which a torque output by a driving force source is transmitted and an output shaft from which a torque is output to a driving wheel. The transmission is able to selectively block torque transmission between the mechanism and the output shaft. The mechanism is rotated by the driving force source with torque transmission between the mechanism and the output shaft blocked. A control apparatus limits a shifting speed of the mechanism to or below an upper-limit speed determined in advance in a case where a speed ratio of the mechanism is changed with the mechanism rotated by the driving force source that is subjected to idling rotational speed control, while the mechanism is blocked from the output shaft such that no torque is transmitted between the mechanism and the output shaft.

9 Claims, 5 Drawing Sheets

(51) Int. Cl.
*F16H 61/04* (2006.01)
*F16H 61/70* (2006.01)
*B60W 10/107* (2012.01)
*F16H 59/22* (2006.01)
*F16H 61/662* (2006.01)
*F16H 37/02* (2006.01)

(52) U.S. Cl.
CPC ....... *F16H 61/66272* (2013.01); *F16H 61/70* (2013.01); *B60W 2510/0638* (2013.01); *B60W 2510/1095* (2013.01); *B60W 2710/0666* (2013.01); *F16H 37/022* (2013.01); *F16H 59/22* (2013.01); *F16H 61/662* (2013.01)

(56) References Cited

U.S. PATENT DOCUMENTS

| | | | | |
|---|---|---|---|---|
| 5,050,455 | A * | 9/1991 | Yamashita | B60W 10/06 477/43 |
| 5,931,884 | A * | 8/1999 | Ochiai | F16H 61/66259 477/101 |
| 6,098,001 | A * | 8/2000 | Yuasa | F16H 61/66259 477/46 |
| 6,199,005 | B1 * | 3/2001 | Iwata | B60K 28/165 180/197 |
| 8,298,119 | B2 * | 10/2012 | Jozaki | F16H 61/66259 477/41 |

* cited by examiner

CONTROL APPARATUS FOR TRANSMISSION FOR VEHICLE

TECHNICAL FIELD

The invention relates to an apparatus that controls a transmission for a vehicle that increases/reduces and outputs a driving force output from a driving force source.

BACKGROUND ART

There is known a vehicle in which the transmission of torque from a transmission to driving wheels can be blocked with a driving force source such as an engine or the like and the transmission coupled to each other in such a manner as to enable the transmission of torque, and an example thereof is described in Japanese Utility Model Application Publication No. 62-45455 (JP 62-45455 U). In the transmission described in this publication, a V-belt shifting device and a directly-coupled gear are arranged in parallel with each other between an input shaft and a countershaft. A primary shaft of the V-belt shifting device is coupled to the input shaft, and a clutch is provided coaxially with a secondary shaft of the V-belt shifting device. The transmission is configured to block the transmission of torque between the V-belt shifting device and the countershaft by releasing the clutch. Besides, another clutch is provided between the input shaft and the directly-coupled gear. The transmission is configured to block the transmission of torque to the countershaft via the directly-coupled gear by releasing the clutch.

In the transmission described in this Japanese Utility Model Application Publication No. 62-45455 (JP 62-45455 U), the V-belt shifting device is coupled to the input shaft even when the transmission of torque between the V-belt shifting device and the countershaft is blocked. Therefore, even when the V-belt shifting device is not involved in the transmission of torque to the countershaft, the speed ratio in the V-belt shifting device can be changed. Even in the case of this shifting, an inertia torque or a loss torque is generated as a result of changes in the rotational speed of a pulley or the like around which a belt is wound. When the rotational speed changes to increase, the torque that changes as a result of shifting acts as a load applied to a driving force source such as an engine or the like. Besides, the torque increases as the shifting speed rises. Therefore, for example, when the idling rotational speed of the engine as a driving force source is controlled, the changes in torque resulting from the aforementioned shifting act as a disturbance to idling rotational speed control. Thus, an abrupt change in idling rotational speed and the occurrence of engine stall are possible.

SUMMARY OF THE INVENTION

This invention has been made in view of the aforementioned technical problem. It is an object of this invention to provide a control apparatus that can prevent or restrain the rotational speed of a driving force source from abruptly changing and the driving force source from going into a stall, as a result of shifting in a transmission that transmits no torque to an output shaft.

In order to solve the aforementioned problem, this invention provides a control apparatus for a transmission for a vehicle. The transmission has a continuously variable speed change mechanism that is provided between an input shaft to which a torque output by a driving force source is transmitted and an output shaft from which a torque is output to a driving wheel. The transmission is configured to be able to selectively block torque transmission between the continuously variable speed change mechanism and the output shaft. The transmission is configured such that the continuously variable speed change mechanism is rotated by the driving force source with torque transmission between the continuously variable speed change mechanism and the output shaft blocked. The control apparatus is characterized by being configured to limit a shifting speed of the continuously variable speed change mechanism to or below an upper-limit speed determined in advance in a case where a speed ratio of the continuously variable speed change mechanism is changed with the continuously variable speed change mechanism rotated by the driving force source that is subjected to idling rotational speed control, while the continuously variable speed change mechanism is blocked from the output shaft such that no torque is transmitted between the continuously variable speed change mechanism and the output shaft.

The upper-limit speed in this invention can be a shifting speed determined based on an output torque of the driving force source that is subjected to the idling rotational speed control, a rotational speed of the driving force source, and a moment of inertia of an output-side rotary member in the continuously variable speed change mechanism.

Besides, in addition to the aforementioned configuration, the control apparatus of this invention may be configured to increase an output torque of the driving force source in a case where the speed ratio of the continuously variable speed change mechanism is changed with the continuously variable speed change mechanism rotated by the driving force source that is subjected to idling rotational speed control, while the continuously variable speed change mechanism is blocked from the output shaft such that no torque is transmitted between the continuously variable speed change mechanism and the output shaft, above an output torque of the driving force source in a case where the speed ratio of the continuously variable speed change mechanism is not changed with the continuously variable speed change mechanism rotated by the driving force source that is subjected to idling rotational speed control, while the continuously variable speed change mechanism is blocked from the output shaft such that no torque is transmitted between the continuously variable speed change mechanism and the output shaft.

In that case, an amount of increase in the output torque of the driving force source may be an amount determined based on a rotational speed of the driving force source, a moment of inertia of the output-side rotary member in the continuously variable speed change mechanism, and a speed at which the speed ratio is changed.

In this invention, a state where the changing of the speed ratio in the continuously variable speed change mechanism may be a state where a transmission mechanism that is provided in parallel with the continuously variable speed change mechanism transmits motive power between the input shaft and the output shaft while the continuously variable speed change mechanism transmits no motive power therebetween, and the driving force source is subjected to idling rotational speed control.

Alternatively, the control apparatus may be configured such that the shifting in the continuously variable speed change mechanism is performed with a neutral range selected while the vehicle runs or is stopped, and with the driving force source subjected to idling rotational speed control.

Besides, the control apparatus may be configured such that the shifting in the continuously variable speed change mechanism is performed with control performed to establish a neutral state while the vehicle runs or is stopped, and with the driving force source subjected to idling rotational speed control.

In this invention, even when the speed ratio obtained by the continuously variable speed change mechanism is changed with the continuously variable speed change mechanism transmitting no torque to the driving wheel, the shifting speed is limited to or below the predetermined upper-limit speed, and the inertia torque generated as a result of shifting is thereby limited. As a result, the amplitude of fluctuations in the torque applied as a load to the driving force source that is subjected to idling rotational speed control decreases. Thus, the rotational speed of the driving force source can be restrained from fluctuating, and also, the driving force source can be restrained from going into a stall.

In particular, when the aforementioned upper-limit speed is determined based on the output torque of the driving force source that is subjected to the idling rotational speed control, the rotational speed of the driving force source, and the moment of inertia of an output-side rotary member in the continuously variable speed change mechanism, the rotational speed of the driving force source can be more effectively restrained from fluctuating, and the driving force source can be more effectively restrained from going into a stall.

Furthermore, if the control apparatus of this invention is configured to increase the output torque of the driving force source in the case where the aforementioned shifting is performed above the output torque of the driving force source in the case where the shifting is not performed, the rotational speed of the driving force source is unlikely to decrease even when the aforementioned inertia torque is applied to the driving force source. Therefore, the shifting speed can be enhanced.

By setting the amount of increase in the output torque in that case to the amount determined based on the rotational speed of the driving force source, the moment of inertia of the output-side rotary member in the continuously variable speed change mechanism, and the speed at which the speed ratio is changed, the shifting speed of the continuously variable speed change mechanism can be enhanced while restraining the output torque of the driving force source from excessively increasing.

MODE FOR CARRYING OUT THE INVENTION

This invention is applicable to a vehicle that is equipped with a driving force source that is subjected to idling rotational speed control, and a continuously variable speed change mechanism that is coupled to an output side of the driving force source and can control the speed of shifting. In this vehicle, the transmission of torque from the continuously variable speed change mechanism to driving wheels can be appropriately blocked. Accordingly, concrete examples of the driving force source include an internal combustion engine such as a gasoline engine or the like, and a hybrid-type driving force source that is equipped with the internal combustion engine and a motor. Besides, a belt-type or toroidal-type transmission is an example of the continuously variable speed change mechanism. The transmission to which this invention is applied may be a transmission having a single motive power transmission path including a continuously variable speed change mechanism, or a transmission having another or other motive power transmission paths in parallel with this single motive power transmission path.

Figure 8:
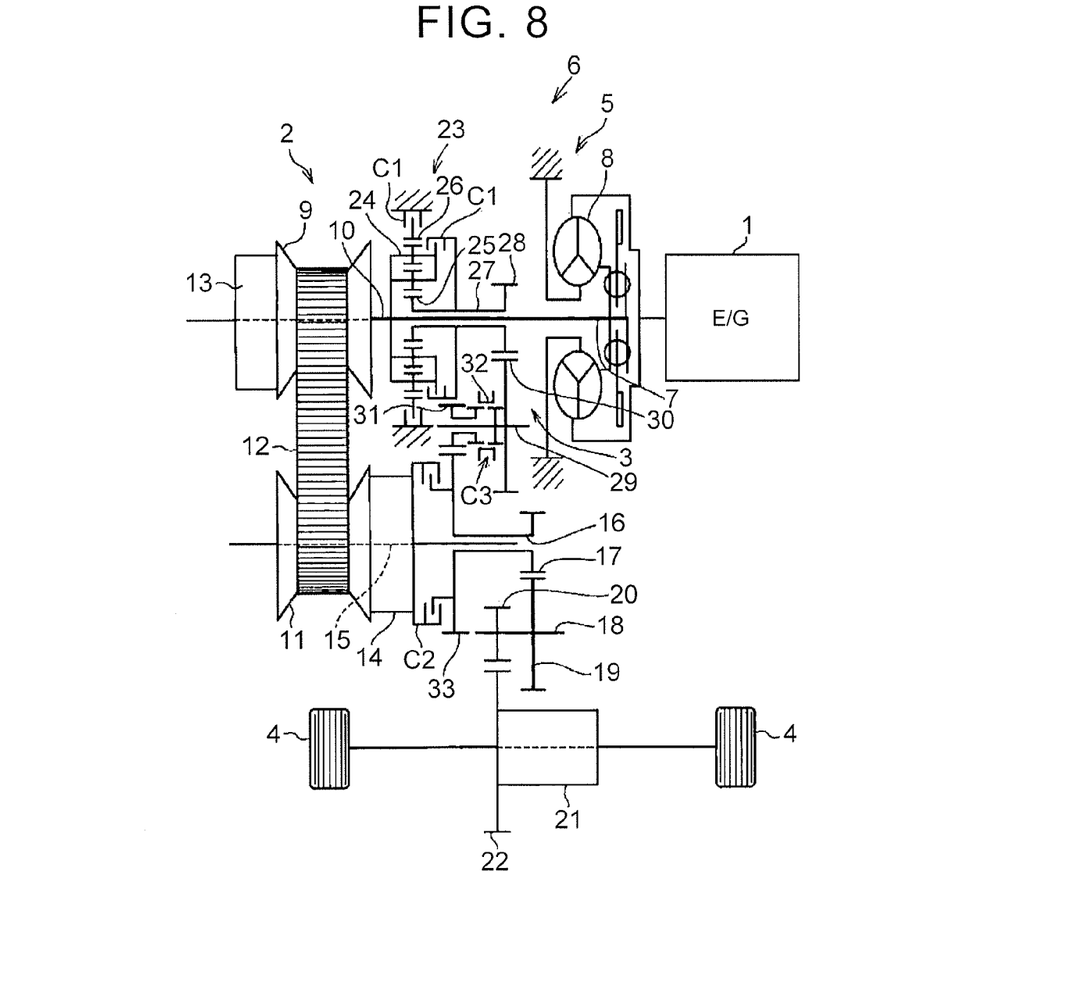
FIG. 8 is a skeleton diagram showing a power train in a vehicle to which this invention is applicable.

FIG. 8 shows an exemplary power train in the vehicle to which this invention is applicable. The example shown herein is an example in which the vehicle is equipped with an internal combustion engine (an engine: E/G) 1 as a driving force source, and is configured to transmit a torque output by the engine 1 to driving wheels 4 via a belt-type continuously variable speed change mechanism 2 and a transmission mechanism 3 that is constituted of a plurality of gears. The continuously variable speed change mechanism 2 and the transmission mechanism 3 are provided in parallel with each other. A torque converter 5 equipped with a lockup clutch is coupled to the engine 1. An input shaft 7 of a transmission 6 is coupled to a turbine runner 8 in the torque converter 5.

The input shaft 7 is coupled to a primary shaft 10 that is integrated with a primary pulley 9 in the continuously variable speed change mechanism 2. A secondary pulley 11 is arranged parallel to the primary pulley 9. A belt 12 is wound around these pulleys 9 and 11. As is the case with a conventionally known belt-type continuously variable transmission, these pulleys 9 and 11 have a fixed sheave, a movable sheave, and hydraulic actuators 13 and 14 that longitudinally move the movable sheave with respect to the fixed sheave, and are configured as follows. The hydraulic actuators 13 and 14 generate a clamping force of the belt 12. The hydraulic actuator 13 in the primary pulley 9 changes the groove width of the primary pulley 9 to change the winding radius of the belt 12, namely, the speed ratio.

A secondary shaft 15 that is integrated with the secondary pulley 11 is provided, and an output shaft 16 is rotatably fitted on an outer periphery side of the secondary shaft 15. An output gear 17 is attached to this output shaft 16. This output gear 17 meshes with a counter driven gear 19 that is integrated with a countershaft 18 that is arranged parallel to the output shaft 16. Besides, a counter drive gear 20 that has a smaller diameter than the counter driven gear 19 is attached to the countershaft 18. This counter drive gear 20 meshes with a ring gear 22 of a differential gear 21 as a final reduction gear. Moreover, this differential gear 21 is configured to output a torque to the right and left driving wheels 4.

On the other hand, a forward-backward changeover mechanism 23 is provided coaxially with the input shaft 7 or the primary shaft 10 and on an outer periphery side thereof. This forward-backward changeover mechanism 23 is constituted by a double pinion-type planetary gear mechanism. A carrier 24 of the forward-backward changeover mechanism 23 is coupled to the primary shaft 10. A starting clutch C1 is provided between the carrier 24 and a sun gear 25. By engaging this starting clutch C1, the entire planetary gear mechanism integrally rotates. Besides, a backward brake B1 that stops rotation of a ring gear 26 is provided. By stopping rotation of the ring gear 26 with the aid of this backward brake B1, the sun gear 25 is configured to rotate in the opposite direction of the carrier 24 to establish a backward state.

Next, the transmission mechanism 3 that is arranged in parallel with the aforementioned continuously variable speed change mechanism 2 will be described. This transmission mechanism 3 is a deceleration mechanism that sets a speed ratio larger than a maximum speed ratio in the continuously variable speed change mechanism 2, or an acceleration mechanism that sets a speed ratio smaller than a minimum speed ratio in the continuously variable speed change mechanism 2. The transmission mechanism 3 in the example shown in FIG. 8 is configured as a deceleration mechanism. Moreover, an idle gear is provided such that the input shaft 7 and the output shaft 16 rotate in the same direction.

A sun gear shaft 27 that is integrated with the sun gear 25 is rotatably fitted on an outer periphery side of the input shaft 7. A driving gear 28 is attached to the sun gear shaft 27. Besides, an intermediate shaft 29 is arranged parallel to the input shaft 7 and the output shaft 16. A driven gear 30 that meshes with the driving gear 28 is integrated with the intermediate shaft 29. This driven gear 30 has a larger diameter than the driving gear 28, and is configured to create a decelerating action in transmitting torque from the driving gear 28 toward the driven gear 30. A drive gear 31 that has a smaller diameter than the driven gear 30 is attached to the intermediate shaft 29 in such a manner as to be rotatable relatively to the intermediate shaft 29. A clutch C3 for coupling this drive gear 31 to the intermediate shaft 29 in such a manner as to enable the transmission of torque is provided. This clutch C3 is a so-called dog-type clutch, and is configured to axially move a sleeve 32 to thereby spline-fit the sleeve to the intermediate shaft 29 and a hub of the drive gear 31 or cancel the fitting. Furthermore, a driven gear 33 that meshes with this drive gear 31 is provided integrally with the foregoing output shaft 16. Moreover, a clutch C2 that couples the drive gear 31 or the output shaft 26 to the secondary pulley 11 in the continuously variable speed change mechanism 2 in such a manner as to enable the transmission of torque, or that decouples the drive gear 31 or the output shaft 26 from the secondary pulley 11 is provided.

Accordingly, the transmission shown in FIG. 8 is configured such that the transmission of torque between the continuously variable speed change mechanism 2 and the driving wheels 4 is blocked by releasing the clutch C2, and that the continuously variable speed change mechanism 2 can be rotated by the torque of the engine 1 in that state. Besides, by coupling the carrier 24 and the sun gear 25 to each other with the aid of the starting clutch C1, a torque is transmitted from the input shaft 7 to the output shaft 16 via the transmission mechanism 3, and the vehicle runs forward. Besides, when the backward brake B1 is engaged instead of the starting clutch C1, the sun gear 25 and the driving gear 28 that is integrated therewith rotate in the opposite direction of the input shaft 7, a torque is transmitted to the output shaft 16 via the transmission mechanism 3 including the driving gear 28, and the vehicle runs backward. Then, when only the second clutch C2 on the output shaft 16 is engaged, a torque is transmitted from the input shaft 7 to the output shaft 16 via the continuously variable speed change mechanism 2, the vehicle runs forward, and the speed ratio is appropriately set by the continuously variable speed change mechanism 2.

Figure 9:
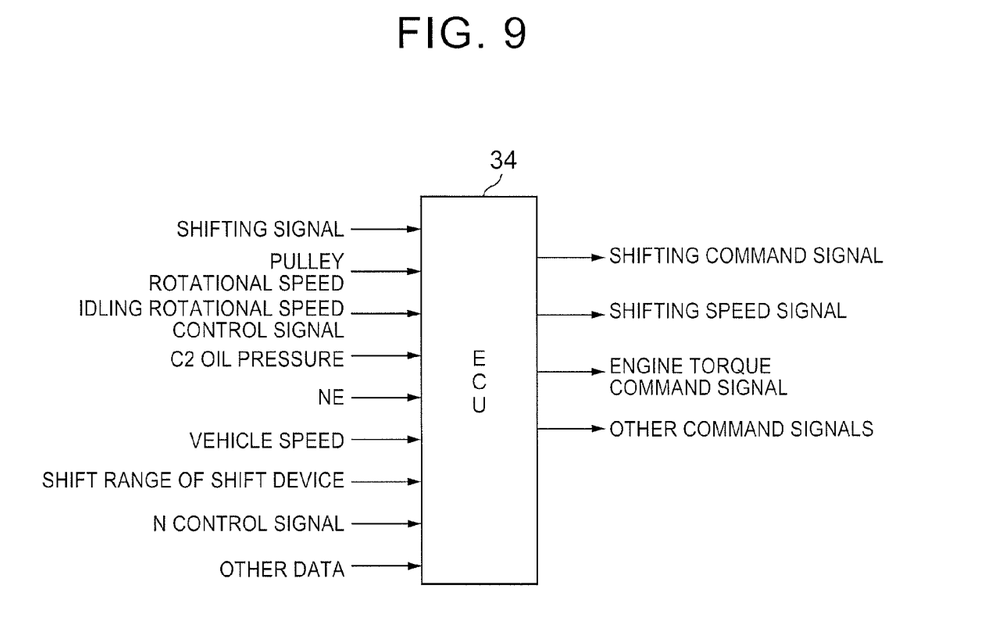
FIG. 9 is a block diagram for illustrating the control apparatus and input data and output signals thereof.

The control apparatus according to this invention is configured to output a predetermined control command signal to the engine 1 and the transmission 6, based on data indicating operation states of the engine 1, the transmission 6 and the like. In more concrete terms, a control apparatus (an ECU) 34 is mainly constituted of a microcomputer. As shown in FIG. 9, a shifting request signal, rotational speeds of the respective pulleys 9 and 11, a signal regarding idling rotational speed control of the engine 1, a signal regarding the foregoing second clutch C2, an engine rotational speed NE, a vehicle speed, a shift range signal from a shift device, a neutral control (N control) signal and the like are input to the control apparatus 34 as data indicating the operation states of the engine 1 and the transmission. The control apparatus 34 is configured to perform computation through the use of these data, data stored in advance and the like, and output a shifting command signal, a shifting speed signal, an engine torque command signal and the like.

In the aforementioned vehicle, a torque is transmitted to the driving wheels 4 via the continuously variable speed change mechanism 2 at the time of normal forward running, and an appropriate speed ratio is set by the continuously variable speed change mechanism 2 in accordance with a request for driving or deceleration or the like. The shifting in the continuously variable speed change mechanism 2 is usually performed with the vehicle running forward to transmit torque via the continuously variable speed change mechanism 2, namely, with the continuously variable speed change mechanism 2 rotating. However, for example, when the vehicle is stopped etc. by being abruptly braked while running at a predetermined vehicle speed, the speed ratio of the continuously variable speed change mechanism 2 may not increase to a predetermined speed ratio in preparation for a low vehicle speed immediately after the start of the vehicle. In such a case, the continuously variable speed change mechanism 2 is not involved in the transmission of torque to the driving wheels 4. Besides, when the engine 1 is in an idling state and is subjected to idling rotational speed control, the continuously variable speed change mechanism 2 may be rotated by the output torque of the engine 1 to perform shifting.

The operation state (the running state) of the vehicle in the case where this shifting is performed is exemplified as follows. First of all, there is a state where the vehicle runs with a driving force transmitted by the foregoing transmission mechanism 3, an accelerator pedal is returned to reduce the accelerator opening degree to "0" or an opening degree close thereto, and the idling rotational speed of the engine 1 is controlled. This is sometimes referred to as "a running EL range (D)". In the power train shown in FIG. 8, the first clutch C1 and the third clutch C3 are engaged. Besides, the aforementioned shifting control is also performed in the case where a neutral range is selected and set during running (a running N range). The neutral range is selected and set through a driver's operation of the shift device (not shown). In the power train shown in FIG. 8, the first clutch C1 and the second clutch C2 are released. The vehicle is in a coasting state and hence in a so-called accelerator-off state. The engine 1 is in an idling state, and idling rotational speed control is performed. In a running state similar to this, control (running N control) is performed to establish a neutral state even when the shift range is a drive range. In this case, in the power train shown in FIG. 8, the first clutch C1 and the second clutch C2 are released. This is an example of control that is referred to as N coasting control. This is a running state that is set through the control of blocking the engine 1 from the driving wheels to cause the vehicle to coast because the accelerator opening degree has been reduced approximately to an opening degree corresponding to a closed state during running. Furthermore, in the case where the neutral range is selected with the vehicle stopped (a stop N range) or the control is performed to establish the neutral state although the shift range is not changed over (stop N control), the aforementioned shifting in the continuously variable speed change mechanism 2 is performed. The control apparatus 34 according to this invention is configured to limit the shifting speed in such a case.

Figure 1:
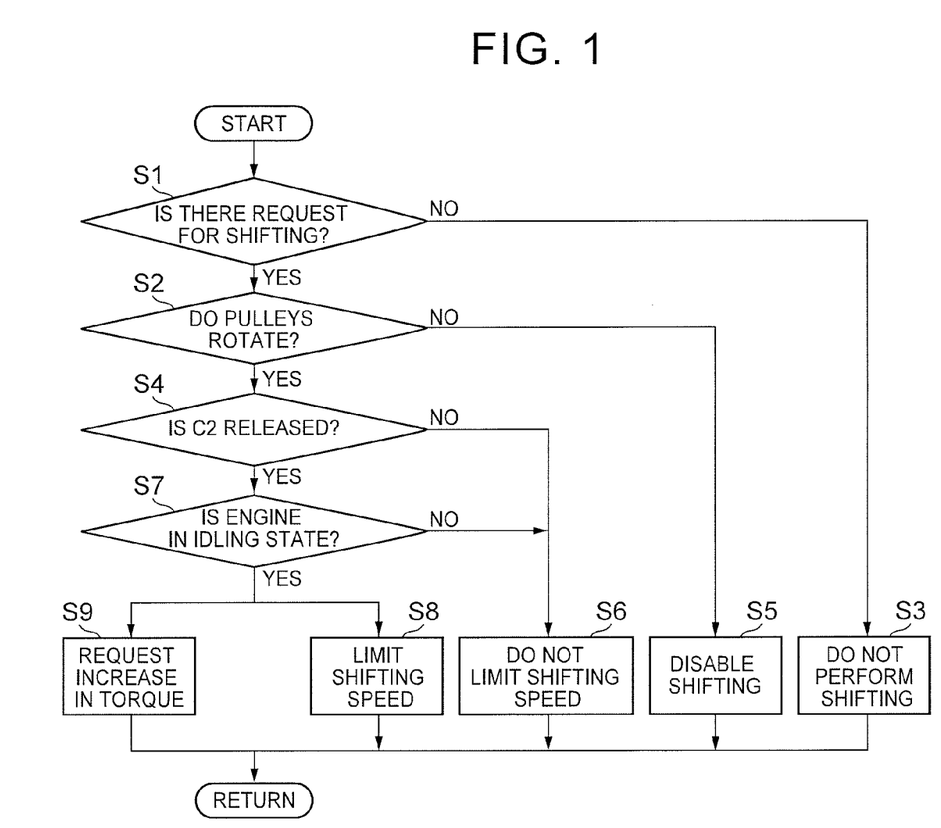
FIG. 1 is a flowchart for illustrating an example of control that is performed by a control apparatus according to this invention.

An example of the control will be described. FIG. 1 is a flowchart for illustrating the example of the control, which is repeatedly performed at intervals of a predetermined short time with the vehicle running while the engine 1 is in operation, or with the vehicle stopped. In the control example shown in FIG. 1, it is first determined whether or not there is a request for shifting (step S1). A target speed ratio in the continuously variable speed change mechanism 2 is set based on the vehicle speed and the engine rotational speed. Therefore, in step S1, a target rotational speed at present and an actual speed ratio that is set in the continuously variable speed change mechanism 2 are compared with each other, and it is determined, based on a result of the comparison, whether or not there is a request for shifting. If there is a difference between the actually set speed ratio and the target speed ratio and there is a request for shifting, the result of the determination in step S1 is affirmative. In this case, it is determined whether or not the foregoing pulleys 9 and 11 rotate (step S2). Incidentally, if the result of the determination in step S1 is negative on the ground that there is no request for shifting, a return is made without performing shifting, namely, without outputting a shifting command signal (step S3).

If the result of the determination in step S2 is affirmative on the ground that the pulleys 9 and 11 of the continuously variable speed change mechanism 2 rotate, the vehicle runs, or the transmission 6 is set in the neutral state. In this case, it is determined whether or not the foregoing second clutch C2 is released (step S4). That is, it is determined whether or not the continuously variable speed change mechanism 2 is decoupled from the output shaft 16 or the driving wheels 4. Incidentally, if the result of the determination in step S2 is negative on the ground that the pulleys 9 and 11 are stopped, the shifting in the continuously variable speed change mechanism 2 is disabled (step S5), and a return is made. This is because it is difficult or impossible to change the winding radius of the belt 12 in the belt-type continuously variable speed change mechanism.

Figure 2:
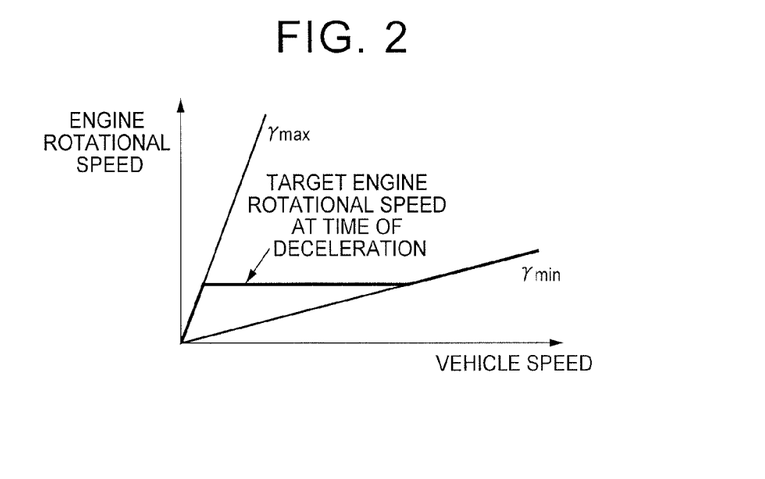
FIG. 2 is a diagram for illustrating a target speed ratio in performing a downshift in a continuously variable speed change mechanism.

If the result of the determination in step S4 is negative on the ground that the second clutch C2 is engaged, the shifting speed is not limited (step S6), and a return is made. The shifting speed is set in advance such that the actual speed ratio changes following the foregoing target speed ratio without causing any delay in particular. FIG. 2 shows an example of changes in the target speed ratio at the time of deceleration. The target speed ratio is changed from a minimum speed ratio γmin to a maximum speed ratio γmax as indicated by a thick line in FIG. 2. The shifting speed in performing shifting such that the actual speed ratio follows changes in the target speed ratio is determined in advance based on an experiment or the like, such that the deceleration becomes neither excessive nor deficient, that the engine does not go into a stall, and furthermore, that a damage to the mechanism, a deterioration in vibration and noise, a deterioration in driveability and the like are not incurred. In step S6, the shifting speed in the case where shifting is performed is set to the shifting speed thus set. Accordingly, when the vehicle runs with the second clutch C2 engaged to transmit torque to the driving wheels 4 via the continuously variable speed change mechanism 2, normal shifting control is performed.

In contrast, if the result of the determination in step S4 is affirmative, the transmission 6 is set in the neutral state, or a torque is transmitted to the output shaft 16 or the driving wheels 4 via the transmission mechanism 3. In this case, it is determined whether or not the engine 1 is in an idling state (step S7). If the result of the determination in step S7 is negative on the ground that the engine 1 is not in an idling state, a transition to the aforementioned step S6 is made to make a return without limiting the shifting speed. In contrast, if the result of the determination in step S7 is affirmative, idling rotational speed control of the engine 1 is performed. In this case, the shifting speed is limited (step S8), and a return is made.

This limitation on the shifting speed is the control for preventing or restraining the engine rotational speed from abruptly changing and the engine from going into a stall as a result of the shifting of the continuously variable speed change mechanism 2. A relationship between the shifting speed and the amounts of change in the engine torque and the engine rotational speed will now be described. An equation of motion of a rotary system from the engine 1 to the continuously variable speed change mechanism 3 is expressed by a formula (1) shown below.

Expression 1

$$I_e\dot{\omega}_e + I_{pri}\dot{\omega}_{pri} + I_{sec}\dot{\omega}_{sec} = T_e - T_{frq} \qquad (1)$$

It should be noted that $I_e$ denotes a moment of inertia of the engine 1, that $\omega_e$ denotes a rotational speed of the engine 1, that $I_{pri}$ denotes a moment of inertia of the primary pulley 9, that $\omega_{pri}$ denotes a rotational speed of the primary pulley 9, that $I_{sec}$ denotes a moment of inertia of the secondary pulley 11, that $\omega_{sec}$ denotes a rotational speed of the secondary pulley 11, that $T_e$ denotes an engine torque, and that $T_{frq}$ denotes various friction loss torques resulting from the second clutch C2 and the like.

Since $\omega_e = \omega_{pri}$ and $\omega_{sec} = \gamma \cdot \omega_{pri}$, the aforementioned formula (1) can be transformed as follows.

Expression 2

$$I_e\dot{\omega}_e + I_{pri}\dot{\omega}_e + I_{sec} \cdot d/dt(\gamma\omega_e) = T_e - T_{frq}$$

$$(I_e + I_{pri})\dot{\omega}_e + I_{sec}(\dot{\gamma}\omega_e + \gamma\dot{\omega}_e) = T_e - T_{frq}$$

$$(I_e + I_{pri} + I_{sec}\gamma)\dot{\omega}_e + I_{sec}\dot{\gamma}\omega_e = T_e - T_{frq}$$

If the engine rotational speed is not changed, the following may be set in the aforementioned expression.

Expression 3

$$\omega_e=0$$

Then, a formula (2) shown below is obtained.

Expression 4

$$T_e - T_{frq} - I_{sec}\omega_e\dot{\gamma} = 0 \tag{2}$$

Figure 3:
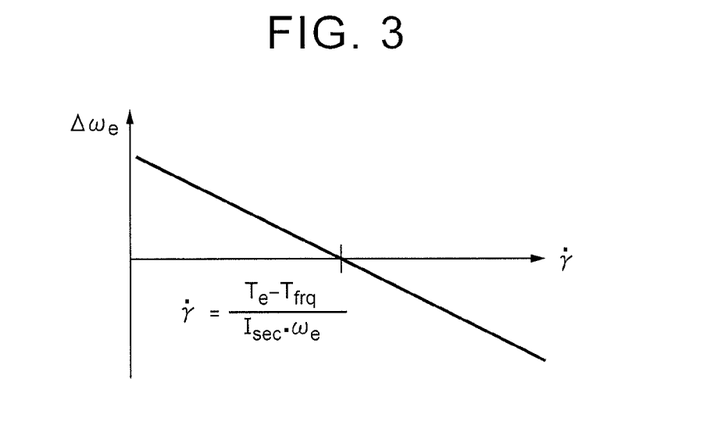
FIG. 3 is a diagram showing a relationship between a shifting speed and an amount of change in rotational speed of an engine that is subjected to idling rotational speed control.

Incidentally, a relationship between the shifting speed and an amount $\Delta\omega_e$ of change in the engine rotational speed is shown in FIG. 3. Accordingly, when the shifting speed is equal to or lower than a response speed in changing the engine torque $T_e$, the rotational speed of the engine 1 that is subjected to idling rotational speed control can be held substantially constant, or the change in the rotational speed can be held small. In the aforementioned step S8, the shifting speed in changing the speed ratio in the continuously variable speed change mechanism 2 is limited to or below a shifting speed (the upper-limit speed in this invention) thus obtained from the engine torque $T_e$, the engine rotational speed $\omega_e$ and the moment of inertia of the secondary pulley 11. Incidentally, the limit shifting speed may be a speed that falls within a range of a predetermined width around the speed obtained in the aforementioned formula (2), or may be a corrected speed. This predetermined width or this correction can be determined through an experiment or a simulation.

Figure 4:
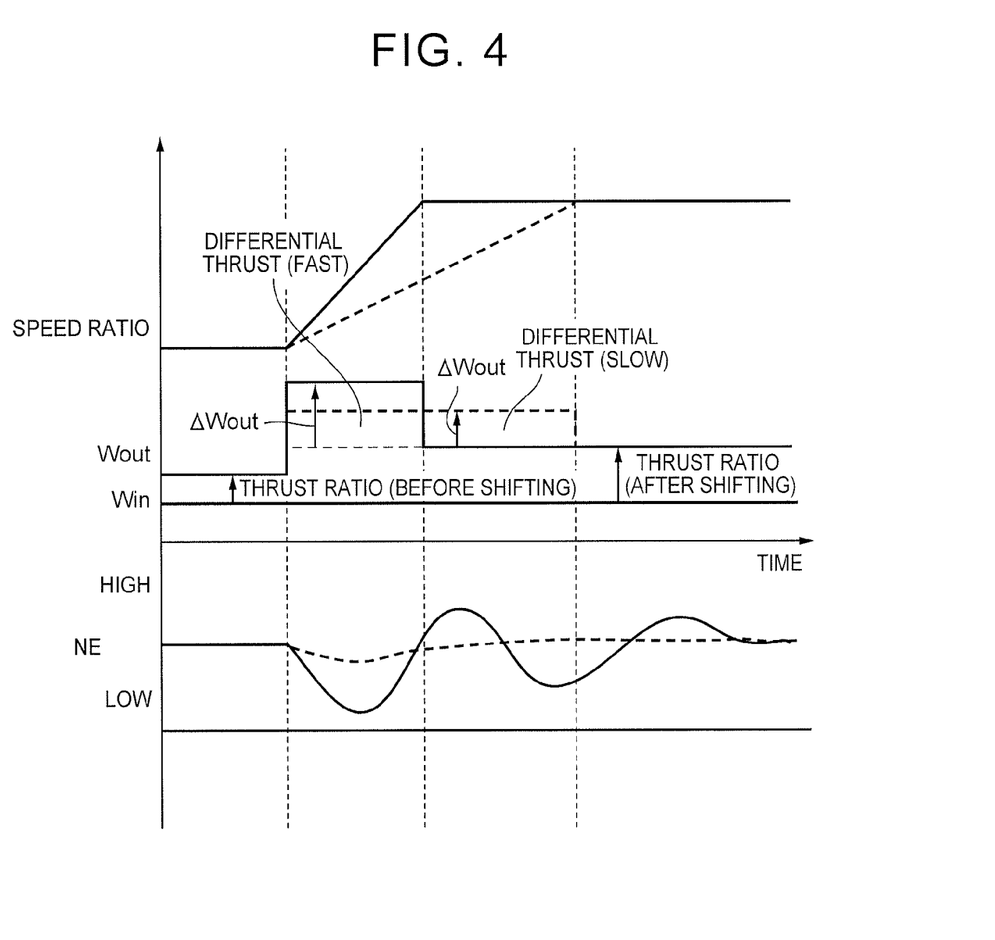
FIG. 4 is a diagram showing a relationship among a difference in thrust between respective pulleys, the shifting speed and changes in rotational speed of the engine, as to a case where the shifting speed is high and a case where the shifting speed is limited.

The shifting in the foregoing belt-type continuously variable speed change mechanism 2 is performed by changing the ratio (the thrust ratio) between thrusts of the respective pulleys 9 and 11. Incidentally, each of the thrusts is an axial force that is generated in each of the hydraulic actuators 13 and 14 in a corresponding one of the pulleys 9 and 11, and is obtained by dividing the oil pressure in each of the actuators 13 and 14 by a corresponding one of pressure-receiving areas. Accordingly, when the speed ratio of the continuously variable speed change mechanism 2 is increased, a thrust Wout of the secondary pulley 11 is made larger than a thrust Win of the primary pulley 9 to increase the difference between the thrusts (a differential thrust). As the differential thrust increases, the shifting speed rises. This is shown in FIG. 4. That is, when the speed ratio is increased for the sake of so-called retraction of the belt, the thrust Wout of the secondary pulley 11 is increased above the thrust before shifting, but is made larger than a thrust value after shifting in the process of shifting. A difference ΔWout between the thrust in this process of shifting and the thrust after shifting is set to a large value as indicated by a solid line in FIG. 4, in the case of normal shifting that is performed with a torque transmitted to the driving wheels 4 via the continuously variable speed change mechanism 2. In contrast, with the control apparatus according to this invention, the difference ΔWout is set to a small value as indicated by a broken line in FIG. 4. Therefore, while the shifting speed is enhanced as indicated by the solid line in FIG. 4 at the time of normal shifting, the shifting speed is lowered as indicated by the broken line in FIG. 4 according to the control apparatus of this invention. Changes in the engine rotational speed NE resulting from this difference in shifting speed are also shown in FIG. 4. When the shifting speed is high, the inertia torque generated in the power train is large, so the engine rotational speed NE greatly fluctuates as indicated by a solid line in FIG. 4. In contrast, when the shifting speed is low, the amplitude of fluctuations in the engine rotational speed NE is small as indicated by a broken line in FIG. 4.

In consequence, the control apparatus according to this invention makes it possible to stabilize the engine rotational speed in changing the speed ratio of the continuously variable speed change mechanism 2 with idling rotational speed control performed, because the inertia torque resulting from the shifting is small etc. Thus, the control apparatus according to this invention can restrain the engine rotational speed from abruptly changing and the engine from going into a stall.

When the speed ratio in the continuously variable speed change mechanism 2 is increased as described above, the inertia torque resulting from the shifting acts as a load torque applied to the engine 1. Accordingly, the engine rotational speed can be restrained from fluctuating, by increasing the engine torque $T_e$ at the time of the shifting of the continuously variable speed change mechanism 2. In the example of control shown in FIG. 1, if the result of the determination in step S7 is affirmative, the engine torque is increased (step S9) while limiting the shifting speed (step S8). An amount $\Delta T_e$ of increase in the engine torque is expressed by a formula (3) shown below.

Expression 5

$$\Delta T_e = T_{frq} + I_{sec}\omega_e\dot{\gamma} \tag{3}$$

It should be noted herein that since the value of the shifting speed (dγ/dt) is determined in advance, the amount $\Delta T_e$ of increase in the engine torque can be calculated. Accordingly, the secondary pulley 11 is equivalent to the output-side member in this invention.

In the case where the speed ratio of the continuously variable speed change mechanism 3 that is not involved in the transmission of torque to the driving wheels 4 is increased, when the engine torque is increased as described above, the shifting speed can be enhanced by relaxing the limitation on the shifting speed. Accordingly, the control of increasing the engine torque may be performed regardless of whether the deceleration is large or small. However, it is preferable to perform the control for preventing the increased engine torque from being perceived as a driving torque. Besides, on the contrary, when the control of increasing the engine torque is not adopted in combination, the shifting may become insufficient due to an increase in the limitation on the shifting speed. Thus, in the case where the speed ratio in the continuously variable speed change mechanism 2 is increased as the vehicle decelerates, it is preferable to combine the limitation on the shifting speed and the increase in the engine torque with each other in accordance with the deceleration of the vehicle, with a view to preventing the engine rotational speed from excessively fluctuating. That is, in the case where the deceleration is small, even when the shifting speed is limited to a somewhat large extent, the speed ratio can be changed to the target speed ratio. However, in the case where the deceleration is moderate, when the shifting speed is limited to a large extent, it is difficult to perform shifting to the target speed ratio. Therefore, the limitation on the shifting speed is relaxed by performing the control of increasing the engine torque in parallel, and the inertia torque resulting therefrom is counterbalanced by the increase in the engine torque. That is, the distribution ratio of the control for performing shifting to the target speed ratio is changed such that the ratio of the control of increasing the engine torque increases. Then, when the deceleration is so large that the speed ratio cannot be changed to the target speed ratio even if the shifting speed is maximized within a permissible range, the shifting speed is not limited with a view to restraining the engine rotational speed from fluctuating. By increasing the engine torque, the engine rotational speed is restrained from fluctuating as a result of the inertia torque.

Figure 5:
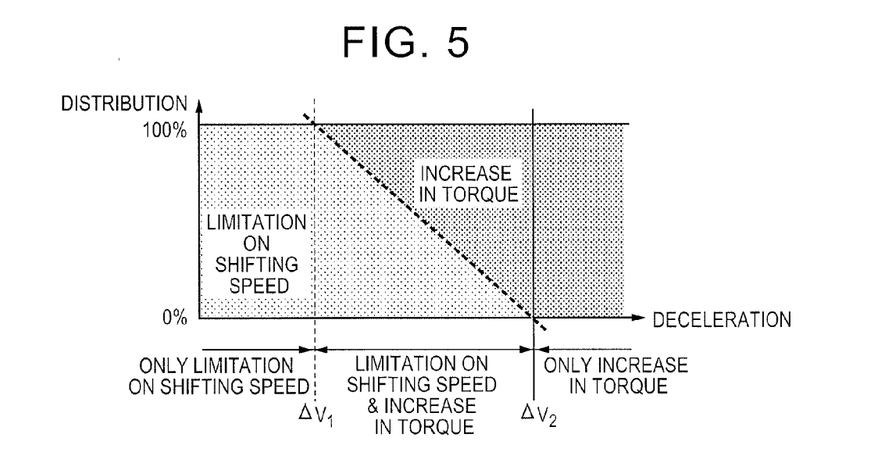
FIG. 5 is a diagram showing a distribution ratio between limitation control of the shifting speed and engine torque control in a case where the rotational speed of the engine is controlled to be held equal to a predetermined rotational speed at the time of shifting, in relation to a deceleration.

This distribution ratio between the respective kinds of control according to the deceleration is schematically shown in FIG. 5. In the case where the deceleration is equal to or smaller than a predetermined value $\Delta V1$, even when the shifting speed in the continuously variable speed change mechanism 2 is limited to prevent the engine rotational speed from excessively fluctuating, the speed ratio of the continuously variable speed change mechanism 2 can be increased to the target speed ratio. Therefore, as the control for restraining the engine rotational speed from excessively fluctuating as a result of shifting, only the control of limiting the shifting speed is performed. In contrast, when the deceleration is larger than the aforementioned predetermined value $\Delta V1$ and equal to or smaller than another predetermined value $\Delta V2$, the engine rotational speed can be restrained from excessively fluctuating, by relaxing the limitation on the shifting speed and using the control of increasing the engine torque in combination. Then, in the case where the deceleration is larger than the aforementioned other predetermined value $\Delta V2$, when the speed ratio is changed toward the target speed ratio without limiting the shifting speed, the engine rotational speed may excessively fluctuate. Therefore, only the control of increasing the engine torque is performed without limiting the shifting speed. Accordingly, in a region where the deceleration is between the aforementioned respective predetermined values $\Delta V1$ and $\Delta V2$, the limitation on the shifting speed is relaxed as the deceleration increases, so the ratio of the control of limiting the shifting speed decreases as the deceleration increases. Therefore, a line separating the ratio of the control of limiting the shifting speed and the control of increasing the engine torque from each other is expressed as a line that descends as the deceleration increases, as shown in FIG. 5.

By the way, the aforementioned concrete example is an example in which the shifting speed is limited to a value determined in advance or to a shifting speed corresponding to the deceleration. However, the restraint of fluctuations in the engine rotational speed in the case where the continuously variable speed change mechanism 2 is decoupled from the driving wheels 4 and is rotated in this state by the torque of the engine 1 subjected to idling rotational speed control to perform shifting can also be achieved by performing feedback-control of the shifting speed using the amount of change in engine rotational speed as a control deviation. This example is shown as a flowchart in FIG. 6.

Figure 6:
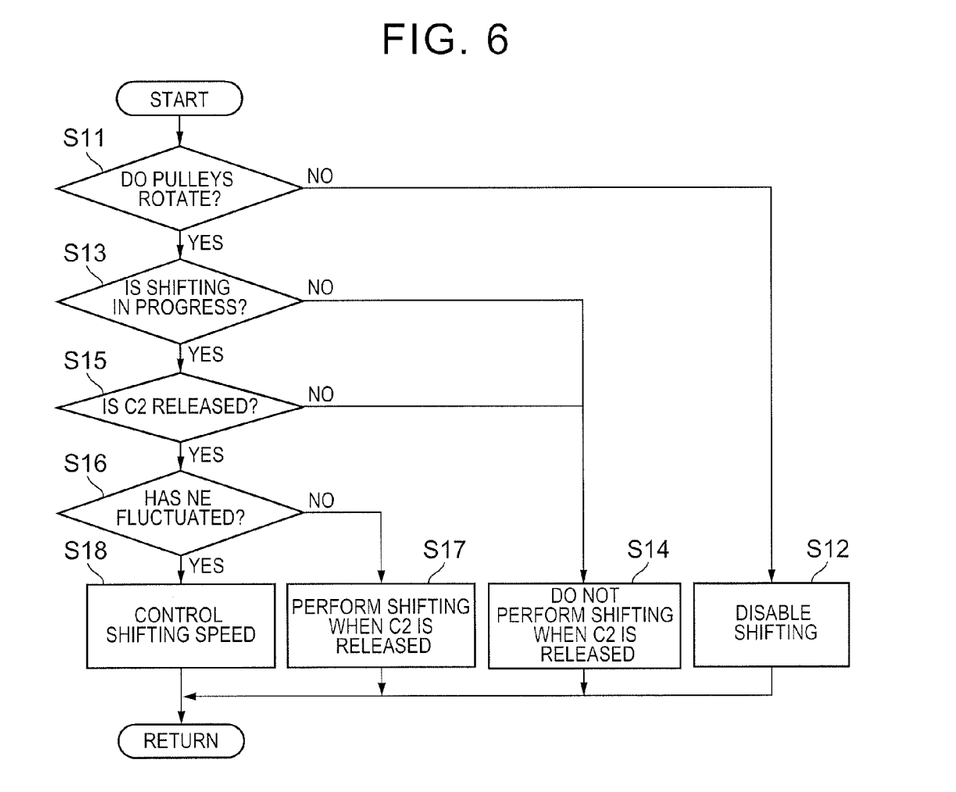
FIG. 6 is a flowchart for illustrating another example of control that can be performed by the control apparatus according to this invention.

A routine shown in FIG. 6 is repeatedly executed at intervals of a predetermined short time, with idling rotational speed control of the engine 1 performed. It is first determined whether or not the foregoing pulleys 9 and 11 rotate (step S11). This determination is made in the same manner as the determination in step S2 in the foregoing routine shown in FIG. 1. If the result of the determination in this step S11 is negative, a return is made without performing shifting, namely, without outputting a shifting command signal (step S12). In contrast, if the result of the determination in step S11 is affirmative, it is determined whether or not shifting is performed in the continuously variable speed change mechanism 2, namely, whether or not shifting is in progress (step S13). If the result of the determination in step S13 is negative on the ground that shifting is not in progress, a flag indicating that shifting is not performed with the foregoing second clutch C2 released is turned on (step S14), and a return is made.

If the result of the determination in step S13 is affirmative on the ground that shifting is in progress, it is determined whether or not the second clutch C2 is released (step S15). If the result of the determination in step S15 is negative on the ground that the second clutch C2 is engaged, a transition to the aforementioned step S14 is made to turn on the aforementioned flag. After that, a return is made. In contrast, if the result of the determination in step S15 is affirmative on the ground that the second clutch C2 is released, it is determined whether or not the engine rotational speed NE has fluctuated (step S16).

The engine rotational speed NE is controlled based on a drive request amount such as the accelerator opening degree or the like at that moment. If the result of the determination in step S16 is negative on the ground that the engine rotational speed NE does not fluctuate in particular with respect to the target rotational speed in the control, shifting of the continuously variable speed change mechanism 2 is performed with the second clutch C2 released (step S17), and a return is made. In concrete terms, the speed ratio of the continuously variable speed change mechanism 2 is changed at a shifting speed determined in advance. In contrast, if the result of the determination in step S16 is affirmative on the ground that the engine rotational speed NE fluctuates, the shifting speed in the continuously variable speed change mechanism 2 is subjected to feedback (F/B) control (step S18), and a return is made.

Figure 7:
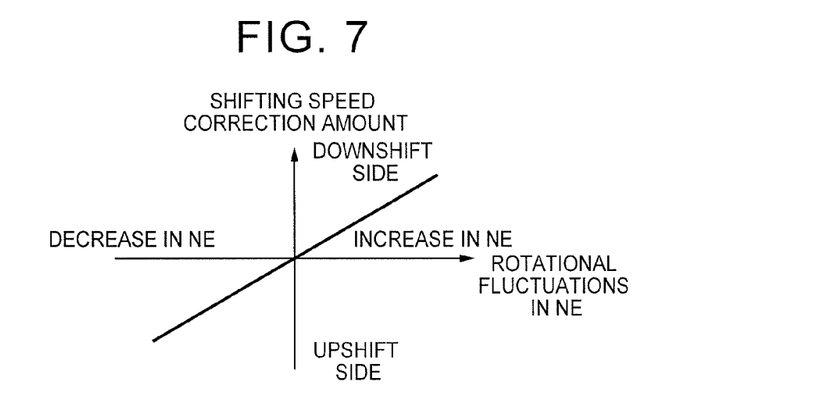
FIG. 7 is a diagram showing an exemplary map of a shifting speed correction amount that can be used in the control.

As described previously, the main factor in fluctuations in the engine rotational speed NE in this shifting state is an inertia torque resulting from shifting. Therefore, the engine rotational speed NE can be restrained from fluctuating by controlling the shifting speed, which is a factor in the generation of the inertia torque. Thus, in step S18, the shifting speed is corrected through feedback control in which the amount of fluctuations in the engine rotational speed NE (the deviation between a target rotational speed and an actual rotational speed) is used as a control deviation. An example of the correction will be described. FIG. 7 shows an exemplary map determining a shifting speed correction amount.

The example shown herein is configured as follows. In the case where the engine rotational speed NE has fluctuated to increase, the correction amount is increased such that the shifting speed in a downshift direction increases in accordance with the amount of increase in the engine rotational speed NE. On the contrary, in the case where the engine rotational speed NE has fluctuated to decrease, the correction amount is increased such that the shifting speed in an upshift direction increases in accordance with the amount of fluctuations (the amount of decrease) in the engine rotational speed NE. Incidentally, the engine rotational speed NE fluctuates to increase when engine torque control is used in combination. In the control in the aforementioned step S18, a shifting speed correction amount and a shifting speed corresponding thereto are obtained from the map in FIG. 7 using, for example, the amount of fluctuations in the engine rotational speed NE as an argument, and the oil pressure of the continuously variable speed change mechanism 2 (the oil pressure of one of the hydraulic actuators 13 and 14) is controlled to achieve the shifting speed. Accordingly, the shifting speed in the continuously variable speed change mechanism 2 can be enhanced to the maximum possible extent without particularly greatly fluctuating the engine rotational speed NE, by performing the control shown in FIG. 6. In other words, the restraint of an abrupt change in the engine rotational speed, engine stall and the like, and prompt shifting can be made compatible with each other.

This invention has been described hereinabove based on the concrete example thereof. However, this invention is not limited to the aforementioned concrete example, but can be appropriately changed within such a range as to achieve the object of this invention. Besides, in the aforementioned concrete example, the control of making the engine rotational speed coincide with the target rotational speed or holding the engine rotational speed equal to the target rotational speed through the control of the engine torque to a large or small value can also be performed alone instead of being used in combination with the control of limiting the shifting speed.

DESCRIPTION OF REFERENCE SYMBOLS

1 . . . INTERNAL COMBUSTION ENGINE (ENGINE: E/G)
2 . . . CONTINUOUSLY VARIABLE SPEED CHANGE MECHANISM
3 . . . TRANSMISSION MECHANISM
4 . . . DRIVING WHEEL
6 . . . TRANSMISSION
7 . . . INPUT SHAFT
9 . . . PRIMARY PULLEY
11 . . . SECONDARY PULLEY
12 . . . BELT
13, 14 . . . HYDRAULIC ACTUATOR
16 . . . OUTPUT SHAFT
17 . . . OUTPUT GEAR
C2 . . . CLUTCH
34 . . . CONTROL APPARATUS (ECU).

What is claimed is:

1. A control apparatus for a transmission for a vehicle, wherein the transmission has a continuously variable speed change mechanism provided between an input shaft to which a torque output by a driving force source is transmitted and an output shaft from which a torque is output to a driving wheel, is configured to be able to selectively block torque transmission between the continuously variable speed change mechanism and the output shaft, and is configured such that the continuously variable speed change mechanism is rotated by the driving force source with torque transmission between the continuously variable speed change mechanism and the output shaft blocked, the control apparatus being configured to limit a shifting speed of the continuously variable speed change mechanism to or below an upper-limit speed determined in advance in a case where a speed ratio of the continuously variable speed change mechanism is changed with the continuously variable speed change mechanism rotated by the driving force source that is subjected to idling rotational speed control, while the continuously variable speed change mechanism is blocked from the output shaft such that no torque is transmitted between the continuously variable speed change mechanism and the output shaft.

2. The control apparatus for the transmission for the vehicle according to claim 1, wherein the upper-limit speed is a shifting speed determined based on an output torque of the driving force source that is subjected to the idling rotational speed control, a rotational speed of the driving force source, and a moment of inertia of an output-side rotary member in the continuously variable speed change mechanism.

3. The control apparatus for the transmission for the vehicle according to claim 1, being configured to increase an output torque of the driving force source in a case where the speed ratio of the continuously variable speed change mechanism is changed with the continuously variable speed change mechanism rotated by the driving force source that is subjected to idling rotational speed control, while the continuously variable speed change mechanism is blocked from the output shaft such that no torque is transmitted between the continuously variable speed change mechanism and the output shaft, above an output torque of the driving force source in a case where the speed ratio of the continuously variable speed change mechanism is not changed with the continuously variable speed change mechanism rotated by the driving force source that is subjected to idling rotational speed control, while the continuously variable speed change mechanism is blocked from the output shaft such that no torque is transmitted between the continuously variable speed change mechanism and the output shaft.

4. The control apparatus for the transmission for the vehicle according to claim 3, wherein an amount of increase in the output torque of the driving force source is an amount determined based on a rotational speed of the driving force source, a moment of inertia of the output-side rotary member in the continuously variable speed change mechanism, and a speed at which the speed ratio is changed.

5. The control apparatus for the transmission for the vehicle according to claim 1, including a transmission mechanism that is provided, in parallel with the continuously variable speed change mechanism, between the input shaft and the output shaft, and being configured such that the changing of the speed ratio in the continuously variable speed change mechanism is carried out with the transmission mechanism transmitting motive power between the input shaft and the output shaft while the continuously variable speed change mechanism transmits no motive power therebetween, and with the driving force source subjected to idling rotational speed control.

6. The control apparatus for the transmission for the vehicle according to claim 1, including being configured such that the changing of the speed ratio in the continuously variable speed change mechanism is carried out with a neutral range selected while the vehicle runs, and with the driving force source subjected to idling rotational speed control.

7. The control apparatus for the transmission for the vehicle according to claim 1, including being configured such that the changing of the speed ratio in the continuously variable speed change mechanism is carried out with control performed to establish a neutral state where torque transmission between the input shaft and the output shaft is blocked while the vehicle runs, and with the driving force source subjected to idling rotational speed control.

8. The control apparatus for the transmission for the vehicle according to claim 1, including being configured such that the changing of the speed ratio in the continuously variable speed change mechanism is carried out with a neutral range selected while the vehicle is stopped, and with the driving force source subjected to idling rotational speed control.

9. The control apparatus for the transmission for the vehicle according to claim 1, including being configured such that the changing of the speed ratio in the continuously variable speed change mechanism is carried out with control performed to establish a neutral state where torque transmission between the input shaft and the output shaft is blocked while the vehicle is stopped, and with the driving force source subjected to idling rotational speed control.

* * * * *